(12) United States Patent
Hanasaki et al.

US011063260B2

(10) Patent No.: US 11,063,260 B2
(45) Date of Patent: Jul. 13, 2021

(54) AQUEOUS BINDER COMPOSITION FOR SECONDARY BATTERY ELECTRODE, SLURRY FOR SECONDARY BATTERY ELECTRODE, BINDER, SECONDARY BATTERY ELECTRODE, AND SECONDARY BATTERY

(71) Applicant: SHOWA DENKO K.K., Tokyo (JP)

(72) Inventors: Mitsuru Hanasaki, Himeji (JP); Tomonori Kurata, Tatsuno (JP); Junya Uchiyashiki, Himeji (JP); Yasuhiro Nakagawa, Kakogawa (JP)

(73) Assignee: SHOWA DENKO K.K., Tokyo (JP)

( * ) Notice: Subject to any disclaimer, the term of this patent is extended or adjusted under 35 U.S.C. 154(b) by 88 days.

(21) Appl. No.: 16/068,824

(22) PCT Filed: Dec. 28, 2016

(86) PCT No.: PCT/JP2016/089024
§ 371 (c)(1),
(2) Date: Jul. 9, 2018

(87) PCT Pub. No.: WO2017/122540
PCT Pub. Date: Jul. 20, 2017

(65) Prior Publication Data
US 2019/0020035 A1    Jan. 17, 2019

(30) Foreign Application Priority Data

Jan. 13, 2016 (JP) .............................. JP2016-004702

(51) Int. Cl.
| | | |
|---|---|---|
| *H01M 4/62* | (2006.01) |
| *C08F 212/08* | (2006.01) |
| *H01M 4/139* | (2010.01) |
| *H01M 4/13* | (2010.01) |
| *H01M 4/04* | (2006.01) |
| *H01M 4/02* | (2006.01) |
| *H01M 4/1393* | (2010.01) |
| *C08F 212/34* | (2006.01) |
| *C08F 236/06* | (2006.01) |
| *H01M 10/0525* | (2010.01) |
| *C08K 5/5435* | (2006.01) |
| *C08L 25/14* | (2006.01) |
| *C08K 5/544* | (2006.01) |

(52) U.S. Cl.
CPC .......... *H01M 4/622* (2013.01); *C08F 212/08* (2013.01); *C08F 212/34* (2013.01); *C08F 236/06* (2013.01); *H01M 4/02* (2013.01); *H01M 4/04* (2013.01); *H01M 4/0404* (2013.01); *H01M 4/13* (2013.01); *H01M 4/139* (2013.01); *H01M 4/1393* (2013.01); *H01M 4/62* (2013.01); *H01M 10/0525* (2013.01); *C08K 5/544* (2013.01); *C08K 5/5435* (2013.01); *C08L 25/14* (2013.01)

(58) Field of Classification Search
CPC .......... H01M 4/622; H01M 4/02; H01M 4/04; H01M 4/0404; H01M 4/13; H01M 4/139; H01M 4/1393; H01M 4/62; H01M 10/0525
See application file for complete search history.

(56) References Cited

U.S. PATENT DOCUMENTS

| | | | |
|---|---|---|---|
| 5,385,975 A | 1/1995 | Nakamura et al. |
| 6,335,114 B1 | 1/2002 | Ueshima et al. |
| 6,517,941 B1 * | 2/2003 | Murase ................... B41M 5/52 | |
| | | | 428/412 |
| 2010/0098947 A1 | 4/2010 | Inoue et al. |
| 2013/0280584 A1 | 10/2013 | Matsumura |
| 2014/0239239 A1 * | 8/2014 | Cha ....................... H01M 4/622 |
| | | | 252/519.33 |
| 2014/0248534 A1 | 9/2014 | Chikugo et al. |

FOREIGN PATENT DOCUMENTS

| | | |
|---|---|---|
| CN | 103891018 A | 6/2014 |
| JP | 2001-093583 A | 4/2001 |
| JP | 2001-93583 A | 4/2001 |
| JP | 2007-109549 A | 4/2007 |
| JP | 2011-049046 A | 3/2011 |
| JP | 2011-243464 A | 12/2011 |

(Continued)

OTHER PUBLICATIONS

LG Chemical, KR20120006667, Translated May 7, 2020 via EPO; published Jan. 19, 2012 (Year: 2012).*
Office Action for corresponding TW 105143639 dated Nov. 8, 2017.
International Search Report for PCT/JP2016/089024, dated Mar. 28, 2017.
Communication dated Jul. 3, 2019, from the European Patent Office in counterpart European Application No. 16885140.0.

(Continued)

*Primary Examiner* — Jimmy Vo
(74) *Attorney, Agent, or Firm* — Sughrue Mion, PLLC

(57) ABSTRACT

An aqueous binder composition for a secondary battery electrode containing a silane coupling agent without ethylenically unsaturated bonds, a resin which is a polymer of at least one kind of ethylenically unsaturated monomers, a resin which is a polymer of at least one kind of ethylenically unsaturated monomer, and at least one kind of solvent selected from water and a hydrophilic solvent. The amount of silane coupling agent is from 0.5 to 9 parts by mass based on 100 parts by mass of ethylenically unsaturated monomer. The pH of the composition is 2.5 to 8.0. Also disclosed is a binder obtained by curing the aqueous binder composition, a slurry containing the aqueous binder composition and an active material, a secondary battery electrode obtained by curing the slurry, and a secondary battery including the secondary battery electrode.

8 Claims, No Drawings

(56) References Cited

FOREIGN PATENT DOCUMENTS

| | | | |
|---|---|---|---|
| JP | 2014-089834 | A | 5/2014 |
| JP | 2014-179321 | A | 9/2014 |
| KR | 10-2012-0006667 | A | 1/2012 |
| KR | 10-2014-0114911 | A | 9/2014 |
| TW | 201307508 | A | 2/2013 |
| TW | 201444153 | A | 11/2014 |
| TW | 201444168 | A | 11/2014 |
| WO | 2012/073996 | A1 | 6/2011 |
| WO | 2012/073996 | A1 | 6/2012 |
| WO | 2013/069280 | A1 | 5/2013 |
| WO | 2014/115802 | A1 | 7/2014 |
| WO | 2014/136799 | A1 | 9/2014 |
| WO | 2014/0136799 | A1 | 9/2014 |

OTHER PUBLICATIONS

Communication dated Jan. 13, 2020 from the Korean Intellectual Property Office in Application No. 10-2018-7018956.
Communication dated Apr. 6, 2021, from the Japanese Patent Office in Application No. 2017-561580.

* cited by examiner

AQUEOUS BINDER COMPOSITION FOR SECONDARY BATTERY ELECTRODE, SLURRY FOR SECONDARY BATTERY ELECTRODE, BINDER, SECONDARY BATTERY ELECTRODE, AND SECONDARY BATTERY

TECHNICAL FIELD

The present invention relates to an aqueous binder composition for secondary battery electrode, a slurry for a secondary battery electrode, a binder, a secondary battery electrode, and a secondary battery.

This application is a National Stage of International Application No. PCT/JP2016/089024 filed Dec. 28, 2016, which claims priority based on Japanese Patent Application No. 2016-004702, filed in Japan on Jan. 13, 2016, the content of which is incorporated herein by reference.

BACKGROUND ART

In recent years, lithium ion secondary batteries have attracted attention in terms of miniaturization and weight reduction of electronic devices such as laptop computers, communication devices such as mobile phones, power tools and the like. Recently, as secondary batteries for electric vehicles or hybrid vehicles, lithium ion secondary batteries having high voltage, high capacity and high energy density have been strongly required from the viewpoint of environmentally friendly batteries.

The lithium ion secondary battery includes a positive electrode using a metal oxide such as lithium cobalt oxide as an active material, a negative electrode using a carbon material such as graphite as an active material, and an electrolyte solvent mainly including carbonates. In the lithium ion secondary battery, charging and discharging of the battery are performed by moving lithium ions between the positive electrode and the negative electrode.

The positive electrode can be obtained by forming a positive electrode layer made from a composition containing a positive electrode active material such as a metal oxide and a binder on a surface of a positive electrode current collector such as an aluminum foil. The negative electrode is obtained by forming a negative electrode layer made from a composition containing a negative electrode active material such as graphite and a binder on the surface of a negative electrode current collector such as a copper foil. Therefore, each binder has a role of binding the active material and the binders and a role of preventing cohesive failure of the positive electrode layer and the negative electrode layer.

Conventionally, as a binder for the positive electrode layer and the negative electrode layer, polyvinylidene fluoride (PVDF) which uses an organic solvent of N-methylpyrrolidone (NMP) as a solvent is used from the viewpoint of resistance to swelling of the resin itself to the electrolytic solution. This binder has been used industrially for many models. However, the binder has a low binding property with an active material and requires a large amount of binder for actual use. As a result, the capacity and energy density of the lithium ion secondary battery are reduced. In addition, since NMP is an expensive organic solvent, when NMP is used as a solvent of a binder, there is also a problem in the price of the final product, and there is also a problem in maintenance of the working environment at the time of producing slurry or current collector.

In order to solve these problems, Patent Document 1 proposes a lithium ion binder having an glass transition temperature of 30° C. or less which is obtained by emulsion-polymerizing ethylenically unsaturated monomers containing a specific content of styrene, ethylenically unsaturated carboxylic acid ester, ethylenically unsaturated carboxylic acid and an internal crosslinking agent as essential components, based on all of the ethylenically unsaturated monomers, in the presence of an emulsifier.

[Patent Document 1] Japanese Unexamined Patent Publication, First Publication No. 2011-243464

SUMMARY OF THE INVENTION

However, although the binder of Patent Document 1 can satisfy battery performance when a specific electrolytic solution is used, the binder tends to swell in an electrolytic solution containing a chain carbonate. As a result, the battery performance cannot be improved satisfactorily. An object of the present invention is to solve the problems of the prior art and to provide a water-dispersible binder which has high electrolytic solution resistance of a binder, good binding properties between active materials and between an active material and a current collector. An object of the present invention is to provide a binder capable of obtaining a secondary battery in which the active material is less likely to peel off from the surface of the current collector in a cutting step performed after the slurry is applied to the current collector surface and cured, and a binder capable of obtaining a secondary battery which has excellent lifetime characteristics during charge and discharge cycles; and to provide an aqueous binder composition for secondary battery electrode to be used. Another object of the present invention is to provide a secondary battery electrode slurry, a binder, a secondary battery electrode obtained by using the same, and a secondary battery including the same.

SUMMARY OF THE INVENTION

The inventors of the present invention conducted intensive studies in order to solve the above problems, and presumed that the electrolytic solution resistance of the binder has a great influence on the battery performance. When the swelling ratio of the binder is high, the binding force between the active material layers is weakened, the active material slides down, and the battery performance declines. Therefore, the present inventors have solved the above problem by focusing on the swelling ratio of the binder in the electrolytic solution.

That is, the present invention provides an aqueous binder composition for secondary battery electrode which is excellent in the binding property between the active materials and the binding property between the active material and the current collector, and which is used for the binder having the electrolytic solution resistance, even when the electrolytic solution composition contains a large content of chain carbonate. The present invention also provides a slurry for a secondary battery electrode obtained by using the same, a binder, a secondary battery electrode, and a secondary battery including the same.

[1] An aqueous binder composition for secondary battery electrode, including a silane coupling agent without ethylenically unsaturated bond, a resin which is a polymer of at least one kind of ethylenically unsaturated monomers, and at least one kind of solvent selected from the group consisting of water and a hydrophilic solvent, wherein the amount of the silane coupling agent is from 0.5 to 9.0 parts by mass based on 100 parts by mass of the ethylenically unsaturated monomers, and the pH of the composition is 2.5 to 8.0.

[2] The aqueous binder composition for secondary battery electrode according to [1], wherein the silane coupling agent is a silane coupling agent containing an epoxy group or a silane coupling agent containing amino group.

[3] The aqueous binder composition for secondary battery electrode according to [1] or [2], wherein the resin is a copolymer of at least styrene and an ethylenically unsaturated carboxylic acid ester.

[4] The aqueous binder composition for secondary battery electrode according to [1] or [2], wherein the resin is a copolymer, the ethylenically unsaturated monomers comprise styrene, an ethylenically unsaturated carboxylic acid ester having no functional group, an ethylenically unsaturated carboxylic acid ester having a functional group, and an ethylenically unsaturated carboxylic acid, an amount of the styrene is 10 to 70% by mass based on the total amount of monomer components forming the copolymer, an amount of the ethylenically unsaturated carboxylic acid ester having no functional group is 25 to 85% by mass based on the total amount of monomer components forming the copolymer, an amount of the ethylenically unsaturated carboxylic acid ester having a functional group d is 0.1 to 10% by mass based on the total amount of monomer components forming the copolymer, and an amount of the ethylenically unsaturated carboxylic acid is 0.01% to 10% by mass based on the total amount of monomer components forming the copolymer.

[5] The aqueous binder composition for secondary battery electrode according to [4], wherein the amount of the ethylenically unsaturated carboxylic acid ester having no functional group is 40 to 55% by mass based on the total amount of monomer components forming the copolymer, the amount of the ethylenically unsaturated carboxylic acid ester having a functional group is 1 to 3% by mass based on the total amount of monomer components forming the copolymer, the amount of the ethylenically unsaturated carboxylic acid is 0.1% to 7% by mass based on the total amount of monomer components forming the copolymer.

[6] The aqueous binder composition for secondary battery electrode according to [4] or [5], wherein the ethylenically unsaturated monomers further comprise an internal crosslinking agent, and the internal crosslinking agent has at least one ethylenically unsaturated bond, and a reactive group reactive with the ethylenically unsaturated carboxylic acid ester having a functional group or a carboxylic group.

[7] A binder which is obtained by curing the aqueous binder composition for secondary battery electrode according to any one of [1] to [6].

[8] A slurry for a secondary battery electrode, comprising the aqueous binder composition for secondary battery electrode according to any one of [1] to [6], and an active material.

[9] A secondary battery electrode which is obtained by curing the electrode slurry according to [8] on a current collector.

[10] A secondary battery electrode comprising a current collector and an active material-containing layer, wherein the active material-containing layer is formed on the current collector, and the active material-containing layer comprises the binder according to claim 7 and an active material.

[11] A secondary battery comprising the secondary battery electrode according to claim 9 or [10].

By using the slurry for a secondary battery electrode made of the aqueous binder composition for secondary battery electrode of the present invention, it is possible to provide a secondary battery electrode binder with electrolyte resistance having a good binding property between active materials and a good binding property between the active material and current collector in the aqueous dispersion system, even when the electrolytic solution composition contains a large content of chain carbonate.

In addition, cycle characteristics of charge and discharge at high temperature of the secondary battery of the present invention can be improved.

DESCRIPTION OF EMBODIMENTS

[Aqueous Binder Composition for Secondary Battery Electrode]

The composition of the present invention is an aqueous binder composition for secondary battery electrode including a silane coupling agent without ethylenically unsaturated bond, a resin obtained by polymerizing an ethylenically unsaturated monomer, and at least one kind of solvent selected from the group consisting of water and a hydrophilic solvent. The amount of the silane coupling agent is 0.5 to 9% by mass with respect to the ethylenically unsaturated monomer (0.5 to 9% by mass with respect to the resin obtained by polymerizing ethylenically unsaturated monomer). The pH of the composition is 2.5 to 8.0 at 23° C.

The composition of one embodiment of the present invention can be used both as an aqueous binder composition for a positive electrode of a secondary battery electrode and as an aqueous binder composition for a negative electrode of a secondary battery electrode, but it is especially effective when the composition is used as an aqueous binder composition for a negative electrode.

(A Silane Coupling Agent without Ethylenically Unsaturated Bond)

The amount of a silane coupling agent without ethylenically unsaturated bond is 0.5 to 9 parts by mass based on 100 parts by mass of all the monomer components forming the copolymer (0.5 to 9 parts by mass per 100 parts by mass of the copolymer), more preferably 2 to 7 parts by mass, further preferably 2.5 to 5 parts by mass. By setting the amount of the silane coupling agent to be used in an amount of 0.5 parts by mass or more, the swelling resistance of the cured film to the electrolytic solution can be easily improved. When the amount is 9 parts by mass or less, stability decrease of the emulsion with time can be prevented.

As the silane coupling agent without ethylenically unsaturated bond, a silane coupling agent containing an epoxy group, a silane coupling agent containing amino group, or the like can be used. As the silane coupling agent without ethylenically unsaturated bond containing an epoxy group, 3-glycidoxypropyltrimethoxysilane, 3-glycidoxypropylmethyldiethoxysilane, 3-glycidoxypropyltriethoxysilane, and the like can be used.

As the silane coupling agent without ethylenically unsaturated bond containing an amino group, N-2-(aminoethyl)-3-aminopropylmethyldimethoxysilane, N-2-(aminoethyl)-3-aminopropyltrimethoxysilane, 3-aminopropyltrimethoxysilane and the like can be used. One of these may be used alone or two or more of them may be used in combination.

The pH of the composition of the present invention is preferably 2.5 to 8.0 at 23° C., more preferably 5.0 to 7.0.

(Resin and Anionic Aqueous Emulsion)

The resin is a polymer of at least one kind of ethylenically unsaturated monomers and is in a state of being dispersed in an anionic aqueous emulsion containing water and/or a hydrophilic solvent. The anionic aqueous emulsion can be prepared by any one of the following methods.

(1) An aqueous emulsion containing 40% by mass of the resin is prepared using an anionic emulsifier.

(2) A reactive anionic emulsifier is used as a polymerizable monomer for producing a resin, and the aqueous emulsion containing 40% by mass of the polymerized resin is prepared.

The above-mentioned preparation method can be used without particular limitation. The resin preferably has an acid value of 100 mg/KOH/g or less, more preferably 75 mg/KOH/g or less, and further preferably 50 mg/KOH/g or less.

From the viewpoint of making the electrode made from the composition of the present invention harder to crack, the resin preferably has a glass transition temperature of 30° C. or less, more preferably 20° C. or less, and further preferably 15° C. or less preferable. From the viewpoint of handling property, it is preferable that the glass transition temperature of the resin is −20° C. or higher.

The glass transition temperature of the resin can be calculated as a theoretical value by the following formula (1), by using the glass transition temperature $Tg_i$ ($i=1, 2, \ldots, i$) of each homopolymer of ethylenically unsaturated monomer $M_i$ ($i=1, 2, \ldots, i$) used for emulsion polymerization of the resin, and each weight fraction $X_i$ ($i=1, 2, \ldots, 1$) of ethylenically unsaturated monomer $M_i$.

$$1/Tg = \Sigma(X_i/Tg_i) \quad (I)$$

Examples of the resins include styrene-butadiene rubber; copolymers of styrene and ethylenically unsaturated carboxylic acid ester; and copolymer of ethylenically unsaturated carboxylic acid ester such as ethylene-vinyl acetate copolymers, ethylene-vinyl versatate copolymers, ethylene-acrylic acid ester copolymers, and the like. Among them, a copolymer of styrene and ethylenically unsaturated carboxylic acid ester is preferable because it can improve the binding property between the active material and the resin, is excellent in resistance to swelling with respect to the electrolyte solvent, and is excellent in charge-discharge cycle characteristics. Copolymers of styrene and ethylenically unsaturated carboxylic acid ester are also excellent because they are excellent in the binding property to the current collector.

A copolymer of at least a styrene and an ethylenically unsaturated carboxylic acid ester (hereinafter sometimes simply referred to as "copolymer") exerts the above-mentioned effect by using styrene and an ethylenically unsaturated carboxylic acid ester in combination. The copolymer can be obtained, for example, by emulsion polymerization of a raw material composition containing styrene, an ethylenically unsaturated carboxylic acid ester and an internal crosslinking agent in an aqueous medium in the presence of an emulsifier.

Styrene mainly has the function of improving the binding property between the active material and the resin and the binding property between the active material-containing layer and the current collector. In particular, when artificial graphite is used as an active material, its effect can be exerted even more.

The amount of styrene to be used is preferably from 10 to 70% by mass, more preferably from 30 to 60% by mass, and further preferably from 35 to 55% by mass based on the total amount of monomer components forming the copolymer preferable. That is, the ratio of the styrene-derived structure contained in the copolymer is preferably 10 to 70% by mass, more preferably 30 to 60% by mass, and further preferably 35 to 55% by mass further preferable.

When the amount of styrene used is 15% by mass or more, the binding property between the active material and the resin and the binding property between the active material-containing layer and the current collector can be easily improved. Further, by setting the amount of styrene to be used in an amount of 70% by mass or less, it is possible to make it difficult for the electrode formed from the composition of the present invention to crack.

The ethylenically unsaturated carboxylic acid ester can be classified into one having no functional group and one having a functional group. Here, the functional group means a hydroxyl group or an epoxy group (glycidyl group).

Examples of the ethylenically unsaturated carboxylic acid ester having no functional group include (meth)acrylate esters such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth) acrylate, n-hexyl (meth)acrylate, 2-ethylhexyl (meth)acrylate, lauryl (meth)acrylate, stearyl (meth)acrylate, cyclohexyl (meth)acrylate, isononyl (meth)acrylate, isobornyl (meth)acrylate, benzyl (methacrylate, and the like. Among them, n-butyl (meth)acrylate, 2-ethylhexyl (meth)acrylate, lauryl (meth)acrylate and isobornyl (meth)acrylate are preferable from the viewpoints of ease of emulsion polymerization and durability.

The amount of the ethylenically unsaturated carboxylic acid ester having no functional group used is preferably from 25 to 85% by mass, more preferably from 30 to 65% by mass, and further preferably from 40 to 55% by mass based on the total amount of monomer components forming the copolymer. That is, the proportion of the structure derived from "ethylenically unsaturated carboxylic acid ester having no functional group" contained in the copolymer is preferably from 25 to 85% by mass, more preferably from 30 to 65% by mass, and further preferably from 40 to 55% by mass.

By setting the amount of the ethylenically unsaturated carboxylic acid ester having no functional group to 25% by mass or more, the flexibility and heat resistance of the formed electrode can be easily improved, and when it is 85% by mass or less, the binding property between the active material and the resin and the binding property between the material-containing layer and the current collector can be easily improved.

As the ethylenically unsaturated carboxylic acid ester having a functional group, ethylenically unsaturated carboxylic acid ester having a hydroxy group, a glycidyl group or the like can be used. Examples thereof include 2-hydroxyalkyl (meth)acrylate such as 2-hydroxyethyl (meth)acrylate, 2-hydroxypropyl (meth)acrylate, and glycidyl acrylate. Of these, 2-hydroxyethyl (meth)acrylate is preferable.

The amount of the ethylenically unsaturated carboxylic acid ester having a functional group used is preferably from 0.1 to 10% by mass, more preferably from 0.5 to 5% by mass, further preferably from 1 to 3% by mass, based on the total amount of monomer components forming the copolymer. That is, the proportion of the structure derived from "ethylenically unsaturated carboxylic acid ester having a functional group" contained in the above copolymer is preferably 0.1 to 10% by mass, more preferably 0.5 to 5% by mass, further preferably 1 to 3% by mass.

The ethylenically unsaturated carboxylic acid may be further used as a monomer forming the copolymer.

Examples of the ethylenically unsaturated carboxylic acid include unsaturated monocarboxylic acids such as acrylic acid, methacrylic acid and crotonic acid, unsaturated dicarboxylic acids such as maleic acid, fumaric acid, itaconic acid and the like, half esters of these unsaturated dicarboxylic acids, and the like. Among these, acrylic acid and itaconic acid are preferable. These ethylenically unsaturated carboxylic acids may be used singly or in combination of two or more kinds.

When a small amount of the ethylenically unsaturated carboxylic acid is added, it can contribute to improvement in emulsion polymerization stability and mechanical stability. However, when a large amount is added, the binding property between the active material and the resin, and the binding property between the active material-containing layer and the current collector tend to decrease. Therefore, the amount of ethylenically unsaturated carboxylic acid to be used is preferably 0.01% by mass or more and 10% by mass or less, more preferably 0.1% by mass or more and 8% by mass or less based on the total amount of monomer components forming the copolymer, and further preferably 0.1% by mass or more and 7% by mass or less. Further, from the viewpoint of production stability, it is preferable to set the acid value of the resin within the above-mentioned range. That is, the ratio of the structure derived from "ethylenically unsaturated carboxylic acid" contained in the above copolymer is preferably from 0.01% by mass to 10% by mass, more preferably from 0.1% by mass to 8% by mass further preferably 0.1% by mass or more and 7% by mass or less.

As the monomer forming the copolymer, a monomer other than the above-mentioned one having at least one polymerizable ethylenic unsaturated group may be used. Examples of such monomers include compounds other than the ethylenically unsaturated carboxylic acid ester having a functional group, and sodium para styrenesulfonate, wherein the compounds have amido groups, nitrile groups or the like. Examples of the compounds include (meth) acrylamide, N-methylol (meth) acrylamide, (meth) acrylonitrile, vinyl acetate, vinyl propionate and the like, Mercaptans, thioglycolic acid and esters thereof, β-mercaptopropionic acid and esters thereof, and the like may be used as monomers for forming the copolymer, in order to adjust the molecular weight.

Further, as a monomer for forming the above copolymer, a reactive emulsifier described later may be used.

In the raw material composition of the copolymer of styrene and the ethylenically unsaturated carboxylic acid ester, it is preferable to further include an internal crosslinking agent (internal crosslinking monomer) in order to further improve the swelling resistance of the cured film against the solvent of the electrolytic solution.

The internal crosslinking agent may have at least one ethylenic unsaturated bond and a reactive group reactive with a functional group possessed by the above-mentioned monomer; or, may have at least two ethylenically unsaturated bonds may be used.

Examples of such internal crosslinking agents include crosslinkable polyfunctional monomers having two or more unsaturated groups such as divinylbenzene, ethylene glycol di(meth)acrylate, trimethylolpropane tri(meth)acrylate, triallyl cyanurate and the like; and silane coupling agents having at least one ethylenically unsaturated bond such as vinyltrimethoxysilane, vinyltriethoxysilane, γ-methacryloxypropyltrimethoxysilane, γ-methacryloxypropyltriethoxysilane and the like. Among them, divinylbenzene, trimethylolpropane tri(meth)acrylate and γ-methacryloxypropyltrimethoxysilane are preferable. One of these internal crosslinking agents may be used alone, or two or more kinds may be used in combination.

The amount of the internal crosslinking agent to be used is preferably 0.01 to 5% by mass, more preferably 0.01 to 4% by mass, further preferably 0.01 to 3% by mass, based on the total amount of monomer components forming the copolymer. When the amount of the internal crosslinking agent to 0.01% by mass or more, the swelling resistance of the cured film to the electrolytic solution can be easily improved, and when the amount is 5% by mass or less, the deterioration of the emulsion polymerization stability can be prevented. That is, the proportion of the structure originating from the internal crosslinking agent contained in the copolymer is preferably 0.01 to 5% by mass, more preferably 0.01 to 4% by mass, further preferably 0.01 to 3% by mass.

As the emulsifier used in the emulsion polymerization, known anionic emulsifiers and nonionic emulsifiers may be used.

Examples of the anionic emulsifier include alkylbenzenesulfonic acid salts, alkylsulfuric acid ester salts, polyoxyethylene alkyl ether sulfuric acid ester salts, fatty acid salts and the like. Examples of the nonionic emulsifier include polyoxyethylene alkyl ether, polyoxyethylene alkyl phenyl ether, polyoxyethylene polycyclic phenylether, polyoxyalkylene alkyl ether, sorbitan fatty acid ester, polyoxyethylene sorbitan fatty acid ester and the like. One of these may be used alone or two or more of them may be used in combination.

Further, if a reactive emulsifier is used as an emulsifier, bleed-out of the emulsifier is prevented and the mechanical stability of the electrode formed from the composition of the present invention can be improved. Therefore it is preferable. Examples of reactive emulsifiers include those represented by the following general formulas (1) to (5).

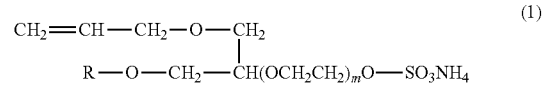

(1)

In the formula, R represents an alkyl group, and m represents an integer of 10 to 40.

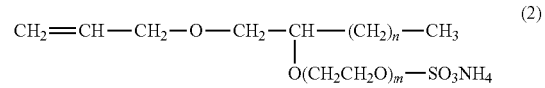

(2)

In the formula, n represents an integer of 10 to 12, and m represents an integer of 10 to 40.

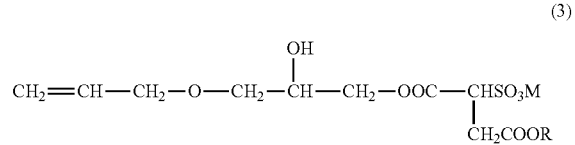

(3)

In the formula, R represents an alkyl group, and M represents NH₄ or Na.

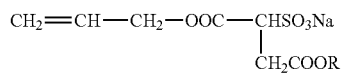

(4)

In the formula, R represents an alkyl group.

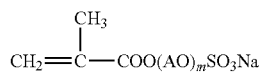

(5)

In the formula, A represents an alkylene oxide having 2 or 3 carbon atoms, and m represents an integer of 10 to 40.

In the case of a non-reactive emulsifier, the suitable amount of the emulsifier is preferably 0.1 to 3 parts by mass, more preferably 0.1 to 2 parts by mass, further preferably 0.2 to 1 parts by mass based on 100 parts by mass based on the total amount of monomer components forming the copolymer. In the case of a reactive emulsifier, the suitable amount of the emulsifier is preferably 0.3 to 5% by mass, more preferably 0.5 to 4% by mass, further preferably 0.5 to 2% by mass, based on the total amount of monomer components forming the copolymer. Also, each of the non-reactive emulsifier and the reactive emulsifier may be used alone, but it is preferable to mix them.

As the radical polymerization initiator used in the emulsion polymerization, known and commonly used radical polymerization initiators can be used, and examples thereof include ammonium persulfate, potassium persulfate, hydrogen peroxide, t-butyl hydroperoxide, and the like. If necessary, redox polymerization may be carried out by using these polymerization initiators in combination with reducing agents such as sodium bisulfite, Rongalite (sodium hydroxymethanesulfinate) and ascorbic acid.

As an emulsion polymerization method, a polymerization method charging components collectively, a polymerization method continuously supplying each component, or the like may be used. The polymerization is usually carried out at a temperature of 30 to 90° C. under stirring. It is possible to improve the polymerization stability, mechanical stability and chemical stability during emulsion polymerization by adjusting the pH by adding a basic substance during or after polymerization of the copolymer. As the basic substance used in this case, ammonia, triethylamine, ethanolamine, caustic soda or the like may be used. One of these may be used alone, or two or more of them may be used in combination. The pH of the adjusted anionic aqueous emulsion is preferably from 2.5 to 8.0, and more preferably from 5 to 7.

[Slurry for Secondary Battery Electrode]

A slurry for a secondary battery electrode according to one embodiment of the present invention includes the aqueous binder composition for secondary battery electrode of the present invention and an active material. If necessary, a thickener and the like can be further included. As the thickener, for example, carboxymethyl cellulose (CMC) can be used.

The slurry of the present invention is preferably used by dispersing or dissolving an active material, a resin and a silane coupling agent without ethylenically unsaturated bond in water or a mixture of water and a hydrophilic solvent. The preparation of the slurry of the present invention can be carried out, for example, by dispersing, dissolving or kneading the resin and a silane coupling agent without ethylenically unsaturated bond in a solvent; then adding the active material and, if necessary, additives; and further dispersing, dissolving or kneading. Alternatively, the preparation of the slurry of the present invention can also be carried out by adding a silane coupling agent without ethylenically unsaturated bond to an anionic aqueous emulsion obtained by emulsion polymerization of ethylenically unsaturated monomer to prepare the aqueous binder composition for secondary battery electrode of the present invention; then adding an additive such as an active material and, if necessary, a thickener or the like to the aqueous binder composition for secondary battery electrode of the present invention; and then dispersing, dissolving or kneading.

It is preferable that the amount of the active material in the slurry of the present invention is 95.0 to 99.5% by mass based on the amount of nonvolatile (mass ratio of the active material with respect to the nonvolatile in the slurry of the present invention) and the amount of the binder in the slurry of the present invention is 0.5 to 5.0% by mass based on the nonvolatile (mass ratio of the binder with respect to the nonvolatile in the slurry). It is more preferable that the amount of the active material is 98.0 to 99.5% by mass, the amount of the binder is 0.5 to 2.0% by mass, and it is further preferably that the amount of the active material is 99.0 to 99.5% by mass, and the amount of the binder is 0.5 to 1.0% by mass.

(Active Material)

The active material includes a positive electrode active material and a negative electrode active material. As an active material, the effect is easily exerted when a negative electrode active material is used.

The shape of the active material is not particularly limited, and a spherical shape, a flake shape, or the like can be used. Among them, a spherical one is preferable from the viewpoint of electron conductivity.

From the viewpoint of the dispersibility of the active material, the average particle size of the active material is preferably 5 to 100 μm, more preferably 10 to 50 μm, and further preferably 15 to 30 μm. The average particle diameter can be measured by laser diffraction method.

The average specific surface area of the active material is preferably from 0.1 to 100 m²/g, more preferably from 0.1 to 50 m²/g, further preferably from 0.1 to 30 m²/g, from the viewpoint of dispersibility of the active material. The average specific surface area can be obtained from the specific surface area measurement by the BET nitrogen adsorption method (conforming to JIS Z 8830).

As the positive electrode active material, a metal complex oxide, particularly a metal complex oxide containing lithium and at least one metal selected from the group consisting of iron, cobalt, nickel, and manganese, and the like can be used. Preferably, $Li_xM_{y1}O_2$ (wherein M is one kind or more, preferably at least one of Co, Mn or Ni, $1.10>x>0.05$, $1 \geq y1>0$), $Li_xM_{y2}O_4$ (wherein M is one or more transition metals, preferably Mn or Ni, $1.10>x>0.05$, $2 \geq y2>0$), or $Li_xM_{y1}PO_4$ (wherein M represents at least one transition metal, preferably at least one of Fe, Co, Mn or Ni, $1.10>x>0.05$, $1 \geq y1>0$) may be used. For example, metal complex oxides represented by $LiCoO_2$, $LiNiO_2$, $Li_xNi_{y3}Mn_zCo_aO_2$ (wherein $1.10>x>0.05$, $1>y3>0$, $1>z>0$, $1>a>0$), $LiMn_2O_4$, $LiFePO_4$, and the like may be used.

Examples of the negative electrode active material include various silicon oxides ($SiO_2$, etc.); carbonaceous materials; metal composite oxides such as $Li_4Ti_5O_{12}$ and the like. In particular, extremely remarkable effects can be exerted when using artificial graphite which is difficult to analyze the properties of the surface.

Artificial graphite is obtained by firing a carbonaceous material such as amorphous carbon, graphite, natural graphite, pitch carbon fiber, polyacetylene or the like at a temperature of about 3000° C., and has a crystal structure different from that of the carbonaceous material. Artificial graphite is a hexagonal plate-like crystal having an atomic bond, and is a layered substance having a structure in the form of a tortoise shell.

[Secondary Battery Electrode]

A secondary battery electrode (hereinafter may be referred to as "the electrode of the present invention") of one embodiment of the present invention includes active material-containing layers that are made from the above-described slurry for a secondary battery electrode of the present invention on a current collector.

The electrode of one embodiment of the present invention can be used both as a positive electrode and a negative electrode of a secondary battery, but can be particularly effective when used as a negative electrode. In particular, when used as a negative electrode of a lithium ion secondary battery electrode, the most effective effect can be obtained.

The current collector of the electrode of the present invention is not particularly limited as long as it is metallic such as iron, copper, aluminum, nickel, stainless steel, or the like. Among them, aluminum is preferable used as a current collector for a positive electrode, and copper is preferable used as a current collector for a negative electrode.

The shape of the current collector is also not particularly limited, but it is usually preferable to use a sheet-shaped one having a thickness of 0.001 to 0.5 mm.

The electrode of the present invention includes a current collector and an active material-containing layer formed on the current collector. The active material-containing layer contains a binder and an active material. The binder is one obtained by curing the aqueous binder composition for secondary battery electrode.

The electrode of the present invention can be obtained, for example, by applying the above-mentioned slurry for a secondary battery electrode of the present invention on a current collector and curing it.

For example, a reverse roll method, a direct roll method, a doctor blade method, a knife method, an extrusion method, a curtain method, a gravure method, a bar method, a dipping method and a squeeze method may be used as the coating method. Among them, from the viewpoint that the surface state of the active material-containing layer can be made favorable by selecting a coating method according to various physical properties such as viscosity and the curability of the slurry of the present invention, the doctor blade method, the knife method, or the extrusion method is preferable. The curing temperature can be selected from 25° C. to 120° C. according to various physical properties, curability and curing time of the resin of the present invention. From the viewpoint of working efficiency, for example, it is preferably from 50° C. to 100° C., and more preferably from 70° C. to 90° C.

In addition, the electrode of the present invention can be pressed as needed after formation of the active material-containing layer. As a method of pressing, a general method can be used, particularly a die-pressing method and a calendar-pressing method are preferable. The pressing pressure is not particularly limited, but is preferably 0.2 to 3 $t/cm^2$.

The electrode of one embodiment of the present invention has good binding property between the active material and the binder and can prevent cohesive failure of the active material-containing layer. In the electrode of the present invention, the binding property between the active material-containing layer and the current collector can be improved. This effect can be made extremely well particularly when copper is used as the current collector.

[Secondary Battery]

A secondary battery of one embodiment of the present invention is a lithium ion secondary battery (hereinafter sometimes referred to as "battery of the present invention"). The battery of the present invention comprises the secondary battery electrode of one embodiment of the present invention described above.

The battery of the present invention can be produced according to a known method using a positive electrode and/or a negative electrode, an electrolytic solution, and parts such as a separator as required. The electrode of the present invention described above may be used for both the positive electrode and the negative electrode, or the electrode of the present invention described above may be used for either the positive electrode or the negative electrode. However, it can exert the effect in particular when the electrode of the present invention described above is used for the negative electrode.

As an exterior body of a battery, a metallic exterior body or an aluminum laminate exterior body can be used. The shape of the battery may be any shapes such as a coin type, a button type, a sheet type, a cylindrical type, a rectangular type, a flat type or the like. As the electrolyte in the electrolytic solution of the battery, any known lithium salt can be used, and it may be selected according to the type of the active material. For example, $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, lower fatty acid lithium carboxylate or the like may be used.

The solvent dissolving the electrolyte is not particularly limited as long as it is commonly used as a liquid for dissolving the electrolyte, and examples thereof include carbonates such as ethylene carbonate (EC), propylene carbonate (PC), butylene carbonate (BC), dimethyl carbonate (DMC), diethyl carbonate (DEC), methylethyl carbonate (MEC) and vinylene carbonate (VC); lactones such as γ-butyrolactone and γ-valerolactone; trimethoxymethane, 1,2-dimethoxyethane; ethers such as diethyl ether, 2-ethoxyethane, tetrahydrofuran and 2-methyltetrahydrofuran; sulfoxides such as dimethylsulfoxide; oxolans such as 1,3-dioxolane and 4-methyl-1,3-dioxolane; nitrogen-containing compounds such as acetonitrile, nitromethane, formamide, dimethylformamide and the like; organic acid esters such as methyl formate, methyl acetate, ethyl acetate, butyl acetate, methyl propionate, ethyl propionate and the like; phosphoric acid triester or diglyme; triglyme; sulfolanes such as sulfolane and methylsulfolane; oxazolidinones such as 3-methyl-2-oxazolidinone; sultones such as 1,3-propane sultone, 1,4-butane sultone and naphthasultone. These may be used singly or in combination of two or more kinds.

The secondary battery of one embodiment of the present invention may be a lithium ion secondary battery.

(Manufacturing Method of Secondary Battery Electrode)

A method for manufacturing a secondary battery electrode includes the following steps:

(I) obtaining an anionic aqueous emulsion having a pH of 2.5 to 8.0 at 23° C. by carrying out emulsion polymerization of ethylenically unsaturated monomers in the presence of an anionic surfactant;

(II) obtaining an aqueous binder composition for secondary battery electrode by adding a silane coupling agent without ethylenically unsaturated bond to the anionic aqueous emulsion so that the amount of the silane coupling agent is 1.5 to 9 parts by mass based on 100 parts by mass of the ethylenically unsaturated monomer;

(III) obtaining a slurry for a secondary battery electrode by mixing the aqueous binder composition for secondary battery electrode and an active material; and (IV) obtaining an active material-containing layer by applying the slurry for a secondary battery electrode onto a current collector and curing it.

A method of manufacturing a secondary battery according to an embodiment of the present invention may be a method of manufacturing a lithium ion secondary battery.

EXAMPLES

Hereinafter, the present invention will be described in more detail with reference to Examples and Comparative Examples, but the present invention is not limited thereto. In the examples and comparative examples, "parts" and "%" indicate parts by mass and % by mass, respectively, unless otherwise specified.

In addition, the following measurements and evaluations were made on the materials used in the examples and comparative examples, the slurry for a secondary battery electrode obtained in the examples and the comparative example, the electrode for a secondary battery, and the secondary battery. The results are shown in Table 1 or 2.

(Bonding Property)

A slurry for a secondary battery electrode (negative electrode) was applied on a copper foil as a current collector so that the wet thickness would be 150 μm, and was cured by heating at 50° C. for 5 minutes. Subsequently, it was cured by heating at 110° C. for 5 minutes and left to stand at 23° C. and 50% RH for 24 hours to prepare a test piece. The slurry-coated surface of the test piece and the SUS plate were bonded using a double-sided tape. A peel strength was measured by carrying out 180° peeling (peel width 25 mm, peel rate 100 mm/min). When the peeling strength is small, it means that the active material-containing layer is likely to undergo cohesive failure and the binding property between the active material and the resin is low.

(Nonvolatile Content)

Approximately 1 g of the evaluation sample was weighed in an aluminum dish with a diameter of 5 cm. The residue was calculated by weighing the sample after it was cured at 105° C. for 1 hour.

(Viscosity)

The viscosity was measured using a Brookfield type rotational viscometer at a liquid temperature of 23° C. and a rotational speed of 60 rpm, using No. 2 or No. 3 rotor.

(Test on Dissolution Rate and Swelling Rate of Cured Coating)

The obtained aqueous binder composition for secondary battery electrode was cured at 23° C. and 50% RH for 7 days and then dried under vacuum at 60° C. for 12 hours to prepare a cured film. The cured film was immersed in a dimethyl carbonate electrolytic solution solvent at 60° C. for 3 days, and the dissolution rate in Expression (1) and the swelling ratio in Expression (2) were measured.

$$\text{Dissolution rate \%} = ((\text{initial mass} - \text{re-drying mass after immersion})/\text{initial mass}) \times 100\% \tag{1}$$

$$\text{Swelling ratio \%} = ((\text{mass after immersion} - \text{re-drying mass after dipping})/\text{re-drying mass after dipping}) \times 100\% \tag{2}$$

(pH Test)

The pH (23° C.) of the emulsion was measured by the glass electrode method. For pH measurement, a pH meter (F-52 manufactured by Horiba) was used. As the pH of the aqueous binder composition, the pH of the measured emulsion was used as it was.

(Measurement Test of Average Particle Size of Resin Particles Dispersed in Anionic Aqueous Emulsion)

The average particle diameter (50% median diameter on volume basis) was measured with a Microtrack UPA type particle size distribution measuring apparatus.

(Temporal Stability Test of Emulsion)

The viscosity after standing at 60° C. for 1 week was measured.

(Cycle Characteristics of Charge and Discharge at High Temperature)

Battery cycle test was performed by charging with constant current constant voltage method (CC–CV) (upper limit voltage 4.2 V, current 1 C, CV time 1.5 hours), and discharging with constant current method (CC) (lower limit voltage 3.0 V, Current 1 C), both of which were carried out at 45° C. The capacity retention rate was defined as the ratio of the discharge capacity at the 200th cycle to the discharge capacity at the first cycle.

(Synthesis of Anionic Aqueous Emulsion A)

32.6 parts of ion-exchanged water and 0.11 part of a reactive anionic emulsifier (trade name: Eleminol JS-20, manufactured by Sanyo Chemical Industries, active ingredient 40%) and 0.02 part of a nonreactive anionic emulsifier (trade name HiTenol 08E, alkyl ether sulphate, manufactured by Daiichi Kogyo Seiyaku Co., Ltd.) was placed in a separable flask having a cooling tube, a thermometer, a stirrer and a dropping funnel. The temperature was raised to 75° C.

Subsequently, 0.48 parts of a reactive anionic emulsifier represented by the above general formula (4), 0.17 part of a nonreactive anionic emulsifier (trade name HiTenol 08E, manufactured by Daiichi Kogyo Seiyaku Co., Ltd., alkyl ether sulphate), 49.2 parts of styrene, 43.1 parts of 2-ethylhexyl acrylate, 1.9 parts of 2-hydroxyethyl methacrylate, 1.9 parts of acrylic acid, 0.6 part of sodium parasulfonate sulfonate, 0.04 part of divinylbenzene and 67.9 parts of ion exchanged water were previously mixed to obtain a monomer emulsion, and then the monomer emulsion was added dropwise over 3 hours. Simultaneously, 0.4 part of potassium persulfate as a polymerization initiator dissolved in 9.3 parts of ion-exchanged water was added dropwise at 80° C. over 3 hours to perform polymerization. After completion of the dropwise addition, after aging for 2 hours, it was cooled and 2.1 parts of ammonia water was added to obtain an anionic aqueous emulsion A. The ratio of the resin in the obtained anionic aqueous emulsion A was 40%, the viscosity was 40 mPa·s, and the average particle diameter of the resin particles in the emulsion was 250 nm, and the pH was 5.0.

The viscosity was measured using a Brookfield type rotational viscometer at a liquid temperature of 23° C. and a rotational speed of 60 rpm, using No. 2 or No. 3 rotor.

(Synthesis of Anionic Aqueous Emulsions B to D)

Anionic aqueous emulsions B to D were obtained in the same manner as described above, except that the neutralizing agent was changed to the formulation as shown in Table 1.

(Anionic Aqueous Emulsion E)

As the anionic aqueous emulsion E, an anionic aqueous emulsion (40% of the resin, viscosity 11 mPa·s, resin particles in the emulsion) of styrene-butadiene rubber (glass transition temperature: −7° C. (measured value by DSC); average particle diameter: 190 nm; pH: 7.0) was obtained.

Example 1

<Preparation of Aqueous Binder Composition for Secondary Battery Electrode No. 1>

An aqueous binder composition for secondary battery electrode No. 1 (Composition No. 1) was prepared by adding 2.5 parts by mass of 3-glycidoxypropyltrimethoxysilane (manufactured by Shin-Etsu Chemical Co., Ltd. Silane coupling agent, product name KBM-403), based on 100 parts by mass of an ethylenically unsaturated monomer of anionic aqueous emulsion A, to the anionic aqueous emulsion A. The evaluation results of Composition No. 1 are shown in Table 2.

<Preparation of Slurry for Positive Electrode and Positive Electrode>

A slurry for positive electrode was prepared by further mixing 100 parts of N-methylpyrrolidone to a mixture of 90 parts of $LiNi_{1/3}Mn_{1/3}Co_{1/3}O_2$, 5 parts of acetylene black as a conductive auxiliary agent, and 5 parts of polyvinylidene fluoride as a binder.

Then, by the doctor blade method, a positive electrode active material-containing layer was obtained by applying the composition to one side of an aluminum foil having a thickness of 20 μm as a current collector so that the thickness after roll pressing treatment became 60 μm, drying the obtained sample at 120° C. for 5 minutes, and pressing it. The obtained positive electrode active material-containing layer was cut into 50 mm×40 mm and a conductive tab was attached to prepare a positive electrode.

<Preparation of Slurry for Negative Electrode and Negative Electrode>

100 parts of an active material (SCMG (registered trademark)-X, manufactured by Showa Denko KK), 3.75 parts of the above-mentioned aqueous binder composition for secondary battery electrode No. 1, and 50 parts of a 2% aqueous solution of CMC (weight average molecular weight 3,000,000, substitution degree 0.9) were mixed, and 28 parts of water were further added into the mixture to obtain a secondary battery electrode (negative electrode) slurry of Example 1.

Subsequently, the slurry was applied to one side of a copper foil having a thickness of 10 μm as a current collector so as to have a thickness of 60 μm after roll press treatment, cured at 80° C. for 5 minutes, subjected to a pressing step to form a negative electrode active material-containing layer. A negative electrode was prepared by cutting out the obtained negative electrode active material-containing layer into 52 mm×42 mm, and then attaching a conductive tab to it.

<Preparation of Battery>

A separator (trade name: Celgard #2400, made of polyethylene, 10 μm) made of a polyolefin porous film was interposed between the positive electrode and the negative electrode, and the negative electrode were stacked so that the active material-containing layers of the positive electrode and the negative electrode faced each other, and it was stored in an aluminum laminate exterior body (battery pack). An electrolyte containing 1.0 mol/L (liter) of $LiPF_6$ in ethylene carbonate (EC)/dimethyl carbonate (DMC)=40/60 (volume ratio) was injected into the exterior body and vacuum impregnation was carried out, and the secondary battery of Example 1 was obtained.

The evaluation results are shown in Table 2.

Examples 2 to 7 and Comparative Examples 1 to 10

<Preparation of Aqueous Binder Compositions for Secondary Battery Electrode Nos. 2 to 18>

An aqueous binder compositions for secondary battery electrode Nos. 2 to 18 (Compositions Nos. 2 to 18) were obtained in the same manner as above, except that the silane coupling agent was changed to the formulation shown in Table 2. The evaluation results of Compositions Nos. 2 to 18 are shown in Table 2.

<Preparation of Negative Electrode Slurry and Negative Electrode, Production of Battery>

A secondary battery electrode slurry, a secondary battery electrode and a secondary battery were obtained in the same manner as in Example 1 except that the active material and the emulsion used for preparing the negative electrode were changed to the emulsion of Table 2. The evaluation results are shown in Table 2.

TABLE 1

| | | Emulsion A | Emulsion B | Emulsion C | Emulsion D |
|---|---|---|---|---|---|
| Monomer blending ratio | Styrene | 49.2 | 49.2 | 49.2 | 49.2 |
| | 2-Ethylhexyl acrylate | 43.1 | 43.1 | 43.1 | 43.1 |
| | Acrylic acid | 3.1 | 3.1 | 3.1 | 3.1 |
| | Itaconic acid | 1.9 | 1.9 | 1.9 | 1.9 |
| | 2-Hydroxyethyl methacrylate | 1.9 | 1.9 | 1.9 | 1.9 |
| | Divinylbenzene | 0.04 | 0.04 | 0.04 | 0.04 |
| | Sodium para styrenesulfonate | 0.6 | 0.6 | 0.6 | 0.6 |
| | Reactive anionic emulsifier (100%) | 0.2 | 0.2 | 0.2 | 0.2 |
| | Ammonia water | 2.1 | 5.6 | 9.4 | 0.0 |

TABLE 1-continued

|  |  | Emulsion A | Emulsion B | Emulsion C | Emulsion D |
|---|---|---|---|---|---|
| Various physical properties | Nonvolatile content (%) | 40.0 | 40.0 | 40.0 | 40.0 |
|  | Viscosity (mPa · s) | 40 | 60 | 70 | 30 |
|  | pH | 5.0 | 7.0 | 9.0 | 2.0 |
|  | Average particle diameter of resin particles (μm) | 0.25 | 0.27 | 0.28 | 0.23 |
|  | Acid value (mg/KOH) | 40 | 40 | 40 | 40 |

TABLE 2

|  | Composition No. | Emulsion | Silane coupling agent | Amount of silane coupling agent (part) | pH | Viscosity (mPa · s) | EM Temporal stability Viscosity change rate (%) | Coat dissolution rate (%) | Swelling ratio (%) | Binding property (mN/mm) | Battery evaluation Cycle characteristic of Charge and discharge at high temperature (%) |
|---|---|---|---|---|---|---|---|---|---|---|---|
| Example 1 | 1 | A | GPTMS*1 | 2.5 | 5 | 41 | 100 | 6 | 180 | 11 | 84 |
| Example 2 | 2 | A | GPTMS | 5 | 5 | 41 | 150 | 5 | 175 | 12 | 85 |
| Example 3 | 3 | B | GPTMS | 2.5 | 7 | 100 | 150 | 5 | 155 | 12 | 87 |
| Example 4 | 4 | B | GPTMS | 5 | 7 | 900 | 940 | 4 | 145 | 13 | 88 |
| Example 5 | 5 | B | GPTES*2 | 5 | 7 | 90 | 450 | 5 | 170 | 12 | 86 |
| Example 6 | 6 | B | AAPDMS*3 | 5 | 7 | 90 | 100 | 5 | 210 | 12 | 85 |
| Example 7 | 7 | E | GPTMS | 2.5 | 7 | 11 | 110 | 6 | 220 | 9 | 83 |
| Comparative Example 1 | 8 | D | GPTMS | 5 | 2 | 20 | 110 | 9 | 390 | 9 | 79 |
| Comparative Example 2 | 9 | A | GPTMS | 0 | 5 | 40 | 100 | 10 | 410 | 9 | 79 |
| Comparative Example 3 | 10 | A | GPTMS | 0.2 | 5 | 40 | 100 | 9 | 380 | 9 | 78 |
| Comparative Example 4 | 11 | A | GPTMS | 10 | 5 | 43 | Gelling | — | — | — | — |
| Comparative Example 5 | 12 | B | — | 0 | 7 | 60 | 100 | 9 | 400 | 6 | 79 |
| Comparative Example 6 | 13 | B | GPTMS | 0.2 | 7 | 70 | 100 | 9 | 380 | 6 | 79 |
| Comparative Example 7 | 14 | B | GPTMS | 10 | 7 | Gelling | — | — | — | — | — |
| Comparative Example 8 | 15 | B | MPTES*4 | 5 | 7 | 100 | 100 | 8 | 320 | Five | 78 |
| Comparative Example 9 | 16 | C | GPTMS | 5 | 9 | Gelling | — | — | — | — | — |
| Comparative Example 10 | 18 | E | — | 0 | 7 | 11 | 90 | 12 | 380 | 7 | 79 |

*1GPTMS: 3-glycidoxypropyltrimethoxysilane
*2GPTES: 3-glycidoxypropyltriethoxysilane
*3AAPDMS: 2-(aminoethyl)-3-aminopropylmethyldimethoxysilane
*4MPTES: 3-Methacryloxypropyltrimethoxysilane According to the evaluation results of the aqueous binder compositions for secondary battery electrode and the evaluation results of the secondary batteries prepared using the slurries for a secondary battery electrode containing the compositions, as shown in Table 2, the binders contained in the secondary battery electrodes of Examples 1 to 7 made from the aqueous binder compositions for secondary battery electrode of the present invention, has high electrolytic solution resistance and is excellent in recycling characteristics of charging/discharging at high temperature.

What is claimed is:
1. A secondary battery electrode comprising a binder obtained by curing an aqueous binder composition, consisting essentially of:
   a silane coupling agent without ethylenically unsaturated bonds,
   a resin which is a copolymer of ethylenically unsaturated monomers, and
   at least one kind of solvent selected from the group consisting of water and a hydrophilic solvent,
   wherein the ethylenically unsaturated monomers comprise an internal crosslinking agent,
   an amount of the internal crosslinking agent is 0.01 to 5% by mass based on the total amount of monomer components forming the copolymer,
   an amount of the silane coupling agent is from 0.5 to 9.0 parts by mass based on 100 parts by mass of the ethylenically unsaturated monomers, and
   pH of the aqueous binder composition is 2.5 to 8.0, and a glass transition temperature of the resin is 30° C. or less.
2. The secondary battery electrode according to claim 1, wherein the silane coupling agent is a silane coupling agent containing an epoxy group or a silane coupling agent containing amino group.

3. The secondary battery electrode according to claim 1, wherein the ethylenically unsaturated monomers comprise a styrene and an ethylenically unsaturated carboxylic acid ester.

4. The secondary battery electrode according to claim 1, wherein the ethylenically unsaturated monomers comprise styrene, an ethylenically unsaturated carboxylic acid ester having neither a hydroxyl group nor an glycidyl group, an ethylenically unsaturated carboxylic acid ester having at least one of a hydroxyl group and a glycidyl group, and an ethylenically unsaturated carboxylic acid, an amount of the styrene is 10 to 70% by mass based on the total amount of monomer components forming the copolymer, an amount of the ethylenically unsaturated carboxylic acid ester having neither a hydroxyl group nor a glycidyl group is 25 to 85% by mass based on the total amount of monomer components forming the copolymer, an amount of the ethylenically unsaturated carboxylic acid ester having at least one of a hydroxyl group and a glycidyl group is 0.1 to 10% by mass based on the total amount of monomer components forming the copolymer, and an amount of the ethylenically unsaturated carboxylic acid is 0.01% to 10% by mass based on the total amount of monomer components forming the copolymer.

5. The secondary battery electrode according to claim 4, wherein the amount of the styrene is 30 to 60% by mass based on the total amount of monomer components forming the copolymer, the amount of the ethylenically unsaturated carboxylic acid ester having neither a hydroxyl group nor a glycidyl group is 30 to 65% by mass based on the total amount of monomer components forming the copolymer, the amount of the ethylenically unsaturated carboxylic acid ester having at least one of a hydroxyl group and a glycidyl group is 1 to 3% by mass based on the total amount of monomer components forming the copolymer, and the amount of the ethylenically unsaturated carboxylic acid is 0.1% to 7% by mass based on the total amount of monomer components forming the copolymer.

6. The secondary battery electrode according to claim 4, wherein the internal crosslinking agent is a silane coupling agent which has at least one ethylenically unsaturated bond, and a reactive group reactive with the ethylenically unsaturated carboxylic acid ester having at least one of a hydroxyl group and a glycidyl group.

7. A secondary battery comprising the secondary battery electrode according to claim 1.

8. The secondary battery electrode according to claim 1, wherein the internal crosslinking agent consists of an internal crosslinking agent having at least two ethylenically unsaturated bonds.

* * * * *